United States Patent [19]
Okuno et al.

[11] Patent Number: 4,763,264
[45] Date of Patent: Aug. 9, 1988

[54] ENGINE CONTROL SYSTEM

[75] Inventors: Itaru Okuno; Hiroyuki Oda; Tadashi Kaneko, all of Hiroshima, Japan

[73] Assignee: Mazda Motor Corporation, Japan

[21] Appl. No.: 778,268

[22] Filed: Sep. 20, 1985

[30] Foreign Application Priority Data

Sep. 29, 1984 [JP] Japan ............................... 59-205164

[51] Int. Cl.$^4$ ...................... G06G 7/66; F02D 33/02; F02D 41/02; F02M 51/00
[52] U.S. Cl. ................ 364/431.01; 123/361; 123/436; 123/478; 364/431.03
[58] Field of Search ............... 364/431.05, 431.06, 364/431.01, 431.03; 123/361, 436, 478, 480, 486, 489, 491, 492

[56] References Cited
U.S. PATENT DOCUMENTS

| | | | |
|---|---|---|---|
| 3,750,632 | 8/1973 | Zechnall | 123/488 |
| 4,112,885 | 9/1978 | Iwata et al. | 123/361 |
| 4,138,979 | 2/1979 | Taplin | 123/436 |
| 4,168,679 | 9/1979 | Ikeura et al. | 123/486 |
| 4,237,830 | 12/1980 | Stivender | 123/493 |
| 4,391,253 | 7/1983 | Ito | 123/478 |
| 4,393,842 | 7/1983 | Otsuka et al. | 123/489 X |
| 4,445,482 | 5/1984 | Hasegawa et al. | 123/489 |
| 4,473,052 | 9/1984 | Kamiyama et al. | 123/478 |
| 4,552,115 | 11/1985 | Okino | 123/489 |

FOREIGN PATENT DOCUMENTS 51-138235 11/1976 Japan.

*Primary Examiner*—Felix D. Gruber
*Attorney, Agent, or Firm*—Gerald J. Ferguson, Jr.

[57] ABSTRACT

An engine control system comprises an accelerator position sensor for detecting the amount of depression of the accelerator, a target intake air amount determining circuit which receives the output of the accelerator position sensor and determines a target intake air amount, a target fuel feed amount determining circuit which receives the output of the accelerator position sensor and determines a target fuel feed amount, a throttle valve driver which receives the output of the target intake air amount determining circuit and controls the throttle valve to obtain a target throttle valve opening degree corresponding to the target intake air amount, and a fuel feed control circuit which receives the output of the target fuel feed amount determining circuit and controls the amount of fuel to be fed to the engine to the target fuel feed amount.

18 Claims, 3 Drawing Sheets

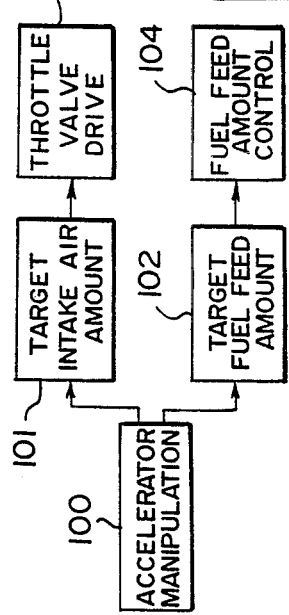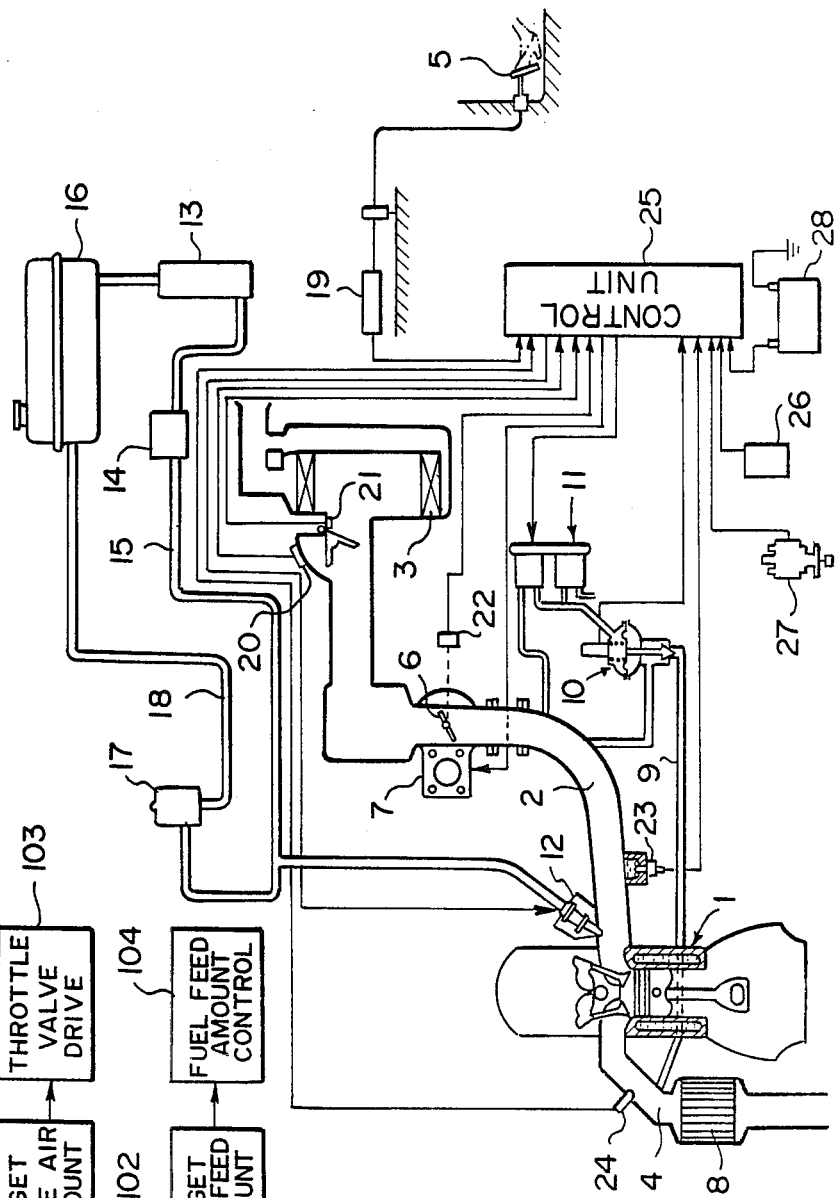

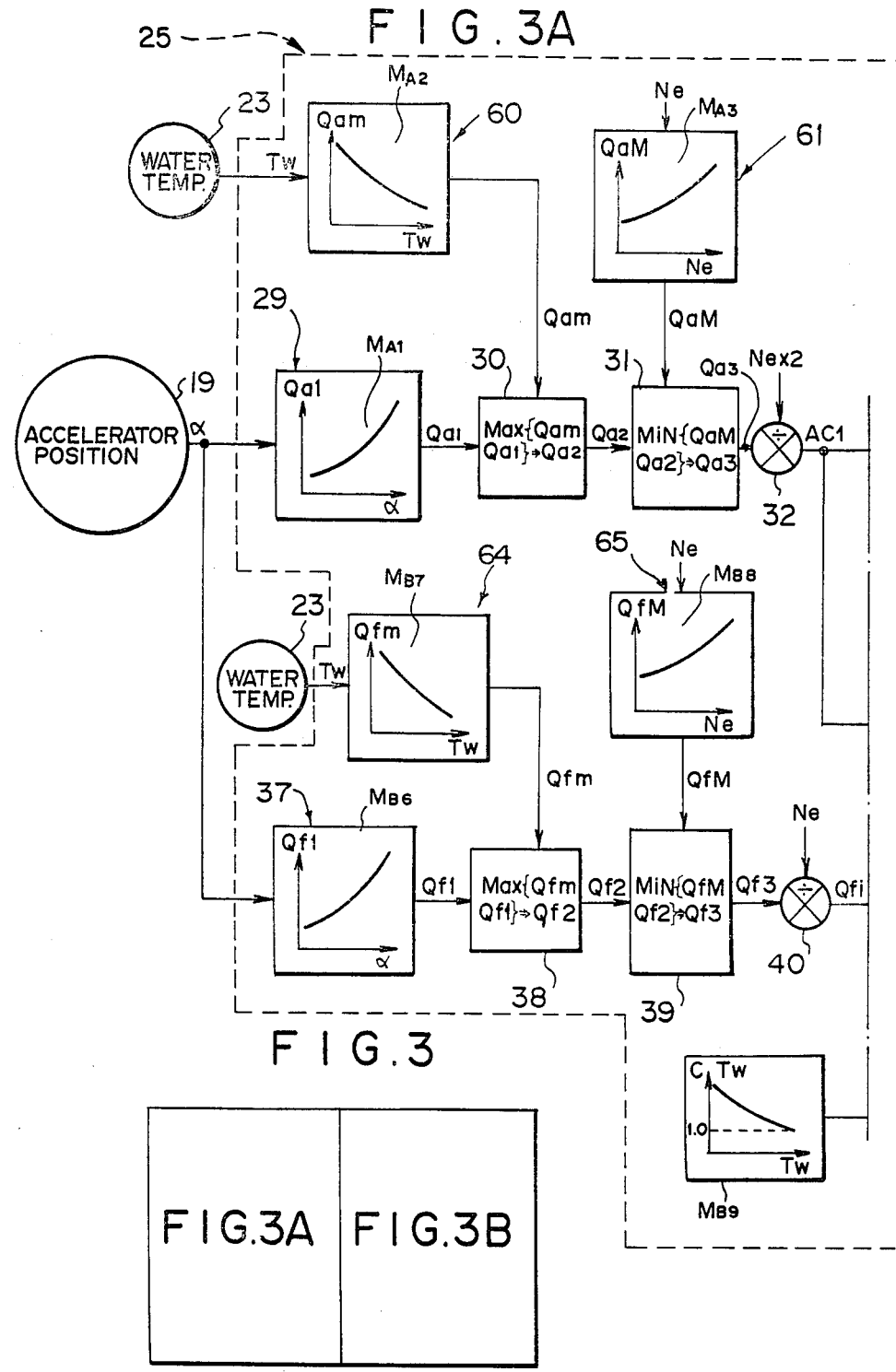

ENGINE CONTROL SYSTEM

BACKGROUND OF THE INVENTION

1. Field of the Invention

This invention relates to an engine control system, and more particularly to an engine control system in which the throttle valve opening degree (the amount of intake air) and the fuel feed amount are electrically controlled according to the amount of depression or manipulation of the accelerator representing the engine output requirement.

2. Description of the Prior Art

In Japanese Unexamined Patent Publication No. 51(1976)-138235, there is disclosed a system for controlling the air-fuel ratio to a predetermined value according to the amount of depression of the accelerator representing the engine output requirement which comprises an accelerator depression detecting means for detecting the amount of depression of the accelerator, a target intake air amount determining means which receives the output of the accelerator depression detecting means and determines a target intake air amount, i.e., a target amount of intake air to be fed to the engine to control the air-fuel ratio of the intake mixture to a predetermined value, and a throttle valve opening degree control means which receives the output of the target intake air amount determining means and controls the opening degree of the throttle valve corresponding to the target intake air amount determined by the target intake air amount determining means, and in which feedback control is effected to control the throttle valve opening degree so that the intake air amount is controlled to the target value determined according to the amount of depression of the accelerator. In the system, the fuel feed amount is controlled according to the intake air amount detected by an airflow meter to converge the air-fuel ratio on a predetermined value.

The conventional system is disadvantageous in that since the throttle opening degree is controlled to obtain the target intake air amount according the amount of depression of the accelerator and the fuel feed amount is controlled according to the output of the airflow meter, the fuel feed amount cannot completely follow changes in the intake air amount and accordingly the air-fuel ratio cannot be precisely controlled to the predetermined value. Particularly, in a transient operating condition of the engine such as when the engine is accelerated or decelerated, though the intake air amount can change in time with change in the amount of depression of the accelerator, the fuel feed amount cannot follow, in time, the change in the intake air amount. Accordingly, when the engine is to be accelerated, the air-fuel ratio is apt to become overlean to cause coughing of the engine. On the other hand, when the engine is to be decelerated, the air-fuel ratio is apt to become overrich to cause misfiring of the engine.

SUMMARY OF THE INVENTION

In view of the foregoing observations and description, the primary object of the present invention is to provide an engine control system in which the air-fuel ratio can be precisely controlled to a predetermined value even in a transient operating condition of the engine.

The engine control system in accordance with the present invention comprises an accelerator depression detecting means for detecting the amount of depression of the accelerator, a target intake air amount determining means which receives the output of the accelerator depression detecting means and determines a target intake air amount, i.e., a target amount of intake air to be fed to the engine, a target fuel feed amount determining means which receives the output of the accelerator depression detecting means and determines a target fuel feed amount, i.e., a target amount of fuel to be fed to the engine, a throttle valve driving means which receives the output of the target intake air amount determining means and controls the throttle valve to obtain a target throttle valve opening degree corresponding to the target intake air amount, and a fuel feed control means which receives the output of the target fuel feed amount determining means and controls the amount of fuel to be fed to the engine to the target fuel feed amount.

In the engine control system of the present invention, the target intake air amount and the target fuel feed amount are simultaneously determined according to the amount of depression of the accelerator and the throttle opening degree and the amount of fuel to be fed are controlled in parallel. Therefore, the amount of intake air and the amount of fuel to be fed are simultaneously changed to the respective target values even in transient operating conditions and the air-fuel ratio can be precisely controlled to a predetermined value.

BRIEF DESCRIPTION OF THE DRAWINGS

FIG. 1 is a view for illustrating the general arrangement of the engine control system in accordance with the present invention, FIG. 2 is a schematic view showing an internal combustion engine provided with an engine control system in accordance with an embodiment of the present invention, and FIGS. 3A and 3B taken together as shown in FIG. 3 are a view illustrating the operation of the control unit employed in the engine control system shown in FIG. 2.

DESCRIPTION OF THE PREFERRED EMBODIMENT

Figure 3B:
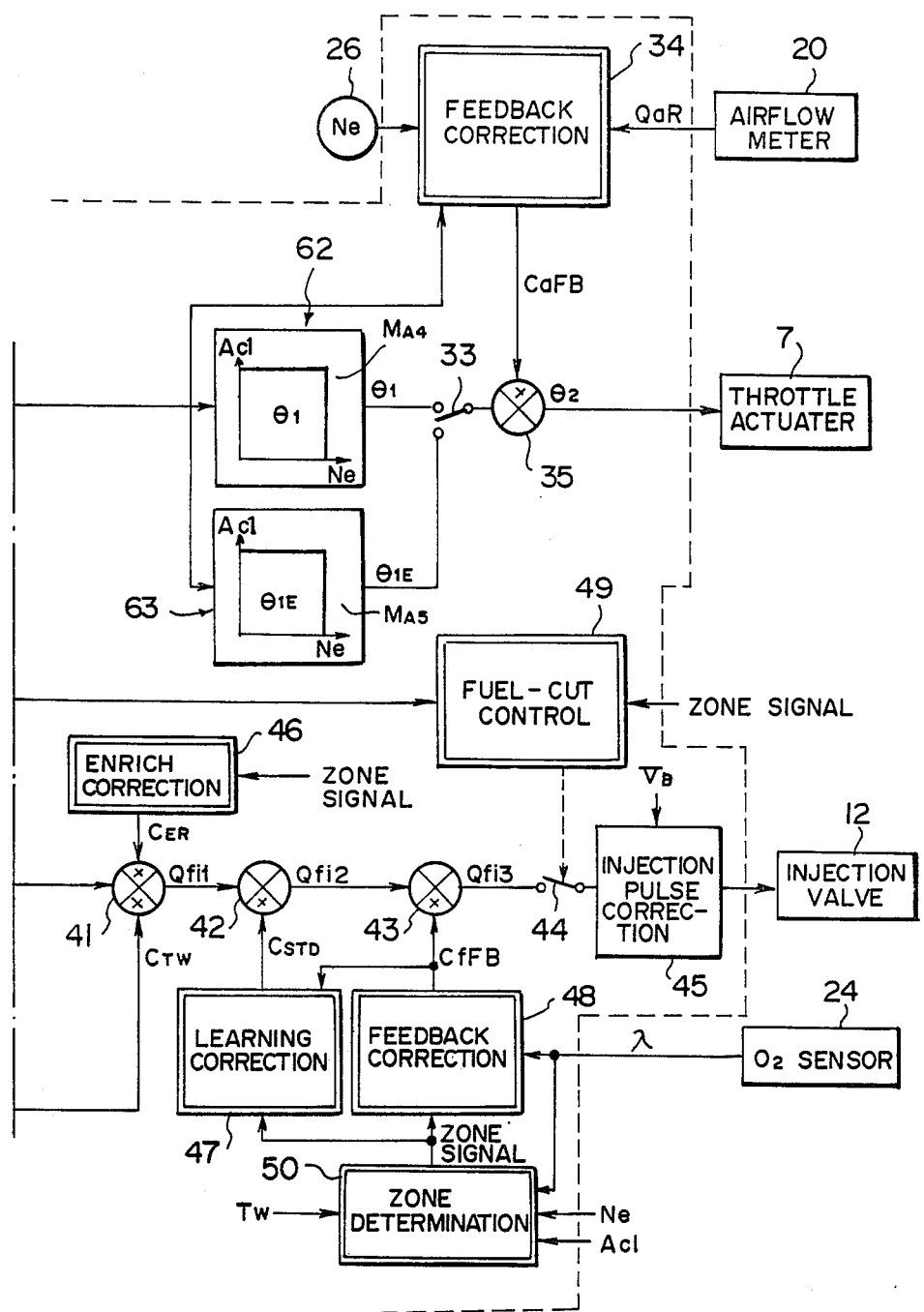

As shown in FIG. 1, the engine control system in accordance with the present invention generally comprises an accelerator depression detecting means 100 for detecting the amount of depression of the accelerator, a target intake air amount determining means 101 which receives the output of the accelerator manipulation detecting means 100 referred to hereafter as accelerator depression detecting means 100) and determines a target intake air amount, a target fuel feed amount determining means 102 which receives the output of the accelerator depression detecting means 100 and determines a target fuel feed amount, a throttle valve driving means 103 which receives the output of the target intake air amount determining means and controls the throttle valve to obtain a target throttle valve opening degree corresponding to the target intake air amount, and a fuel feed control means 104 which receives the output of the target fuel feed amount determining means 102 and controls the amount of fuel to be fed to the engine to the target fuel feed amount.

In FIG. 2, which shows an internal combustion engine 1, e.g., a four-cylinder engine, provided with an engine control system in accordance with an embodiment of the present invention, an intake passage 2 through which intake air is introduced into the combustion chamber of the engine 1 opens to the atmosphere by way of an air cleaner 3. An exhaust passage 4 for discharging exhaust gas opens into the combustion chamber of the engine 1 at one end and to the atmosphere at the other end. Reference numeral 5 denotes an accelerator pedal the amount of depression of which represents the engine output requirement, and reference numeral 6 denotes a throttle valve disposed in the intake passage 2 to control the intake air amount. The accelerator pedal 5 and throttle valve 6 are not mechanically connected with each other, and the throttle valve 6 is electrically driven according to the amount of depression of the accelerator pedal 5 as will be described later. The throttle valve 6 is driven by a throttle actuator 7 which may be a step motor, for instance. The exhaust passage 4 is provided with a catalytic converter 8.

An exhaust recirculation passage 9 is connected to the exhaust passage 4 upstream of the catalytic converter 8 at one end and to the intake passage 2 downstream of the throttle valve 6 at the other end to recirculate a part of exhaust gas. The exhaust recirculation passage 9 is provided with a recirculation control valve 10 which controls the amount of recirculated exhaust gas and is of a diaphragm type actuated by intake vacuum. The recirculation control valve 10 is controlled by a solenoid valve 11.

A fuel injection valve 12 is disposed in the intake passage 2 downstream of the throttle valve 6 and is connected to a fuel tank 16 by way of a fuel feed passage 15. A fuel pump 13 and a fuel filter 14 are provided in the fuel feed passage 15. Fuel is fed to the fuel injection valve 12 from the fuel tank 16 and an excess of fuel is returned to the fuel tank 16 by way of a return passage 18 provided with a fuel-pressure regulator 17, whereby fuel is fed to the fuel injection valve 12 under a predetermined pressure.

Reference numeral 19 denotes an accelerator position sensor (constituting the accelerator depression detecting means 100) for detecting the amount of depression $\alpha$ of the accelerator pedal 5 and reference numeral 20 denotes an airflow meter disposed in the intake passage 2 upstream of the throttle valve 6 for detecting the intake air amount QaR. Further, reference numerals 21 to 24 respectively denote an intake air temperature sensor disposed in the intake passage 2 upstream of the throttle valve 6 to detect the temperature of intake air, a throttle position sensor for detecting the opening degree of the throttle valve 6, a water temperature sensor for detecting the temperature Tw of engine coolant, and an oxygen sensor disposed in the exhaust system 4 upstream of the catalytic converter 8 to detect the air-fuel ratio $\lambda$ through the oxygen concentration in the exhaust gas. The outputs of the accelerator position sensor 19, airflow meter 20, intake air temperature sensor 21, throttle position sensor 22, water temperature sensor 23 and oxygen sensor 24 are input into a control unit 25 for controlling the throttle actuator 7, the solenoid valve 11 and fuel injection valve 12. The control unit 25 may comprise an analogue computer, for instance. An igniter 26 is connected to the control unit 25 to input a signal representing the number of ignitions or the engine rpm Ne. Further, to the control unit 25 are connected a distributor 27 and a battery 28 to respectively input thereinto a signal representing the ignition timing and a signal representing the battery voltage $V_B$.

Now the operation of the control unit 25 will be described with reference to FIG. 3. In FIG. 3, the engine 1 is assumed to be a four-cylinder engine.

The output of the accelerator position sensor 19 representing the amount of depression $\alpha$ of the accelerator pedal 5 is input into both a target intake air amount determining means 29 and a target fuel feed amount determining means 37. The target intake air amount determining means 29 may be, for instance, a function generator which selects a target intake air amount Qa1 to be fed to the engine 1 to obtain a predetermined air-fuel ratio according to the amount of depression $\alpha$ of the accelerator pedal 5 represented by the output of the accelerator position sensor 19 according to a first map $M_{A1}$ in which the target intake air amount Qa1 is related to the amount of depression $\alpha$ of the accelerator pedal 5, and outputs a target intake air amount signal representing the selected target intake air amount Qa1. Similarly, the target fuel feed amount determining means 37 may be, for instance, a function generator which selects a target fuel feed amount Qf1 to be fed to the engine 1 to obtain the predetermined airfuel ratio according to the amount of depression $\alpha$ of the accelerator pedal 5 represented by the output of the accelerator position sensor 19 from a sixth map $M_{B6}$ in which the target fuel feed amount Qf1 is related to the amount of depression $\alpha$ of the accelerator pedal 5, and outputs a target fuel feed amount signal representing the selected target fuel feed amount Qf1. The target intake air amount signal and the target fuel feed amount signal are separately processed in parallel to respectively control the throttle actuator 7 and the fuel injection valve 12.

Processing of the target intake air amount signal will be first described, hereinbelow.

The output of the target intake air amount determining means 29 or the target intake air amount signal is input into a larger value selecting circuit 30 into which is also input the output of a minimum intake air amount generating means 60. The minimum intake air amount generating means 60 may be, for instance, a function generator which selects a minimum intake air amount Qam required to ensure stable idling according to the coolant temperature Tw detected by the water temperature sensor 23 from a second map $M_{A2}$ in which the minimum intake air amount Qam is related to the engine coolant temperature Tw. The larger value selecting circuit 30 compares the target intake air amount Qa1 and the minimum intake air amount Qam respectively selected from the first and seconds maps $M_{A1}$ and $M_{A2}$ with each other, and outputs a signal representing the larger value (Qa2) of the target intake air amount Qa1 and the minimum intake air amount Qam. The output of the larger value selecting circuit 30 is input into a smaller value selecting circuit 31 into which is also input the output of a maximum intake amount generating means 61. The maximum intake air amount generating means 61 may be, for instance, a function generator which selects a maximum intake air amount QaM determined depending on the engine rpm Ne (the maximum amount of intake air which can be introduced into the combustion chamber with the throttle valve 6 fully opened at a given engine rpm) from a third map $M_{A3}$ in which the maximum intake air amount QaM is related to the engine rpm. The smaller value selecting circuit 31 compares the larger value Qa2 represented by the output of the larger value selecting circuit 30 with the maximum intake air amount QaM corresponding to the engine rpm Ne, and outputs a signal representing the smaller value (Qa3) of the larger value Qa2 and the maximum intake air amount QaM. That is, the smaller value Qa3 represents a corrected target intake air amount corrected taking into account the engine coolant temperature Tw and the maximum intake air amount QaM which is the maximum amount of intake air which can be introduced into the combustion chamber with the throttle valve 6 fully opened at a given engine rpm.

The corrected target intake air amount Qa3 is input into a divider 32. The divider 32 divides the corrected target intake air amount Qa3 by the doubled engine rpm Nex2 to obtain a target intake air amount Ac1 for each cylinder. (In this particular embodiment, the engine 1 is assumed to be a four-cylinder engine as described above.) The output of the divider 32 or the target intake air amount Ac1 for each cylinder is input into a non-EGR-time throttle opening degree generating means 62, an EGR-time throttle opening degree generating means 63 and an intake air amount feedback correction module 34. The non-EGR-time throttle opening degree generating means 62 may be, for instance, a function generator which generates a target throttle valve opening degree $\theta 1$ suitable for obtaining the target intake air amount Ac1 for each cylinder when exhaust gas recirculation is not effected in accordance with a fourth map $M_{A4}$ in which the target throttle valve opening degree $\theta 1$ is related to the target intake air amount Ac1 for each cylinder and the engine rpm Ne. The EGR-time throttle opening degree generating means 63 may be, for instance, a function generator which generates a target throttle valve opening degree $\theta 1E$ suitable for obtaining the target intake air amount Ac1 for each cylinder when exhaust gas recirculation is effected in accordance with a fifth map $M_{A5}$ in which the target throttle valve opening degree $\theta 1E$ is related to the target intake air amount Ac1 for each cylinder and the engine rpm Ne. The output of the non-EGR-time throttle opening degree generating means 62 and the output of the EGR-time throttle opening degree generating means 63 are selectively input into a multiplier 35 by way of a changeover switch 33 which is connected to the non-EGR-time target throttle opening degree generating means 62 when exhaust gas recirculation is not effected and to the EGR-time target throttle opening degree generating means 63 when exhaust gas recirculation is effected. The intake air amount feedback correction module 34 receives, in addition to the output of the divider 32 representing the target intake air amount Ac1 for each cylinder, the outputs of the igniter 26 and the airflow meter 20 respectively representing the engine rpm Ne and the actual intake air amount QaR, and compares the target intake air amount Ac1 for each cylinder with the actual intake air amount AcR for each cylinder derived from the actual intake air amount QaR and the engine rpm Ne, and calculates a feedback control coefficient CaFB for feedback-controlling the throttle valve opening degree according to the difference between target intake air amount Ac1 for each cylinder and the actual intake air amount AcR for each cylinder. The multiplier 35 multiplies, by the feedback control coefficient CaFB, either the target throttle valve opening degree $\theta 1$ for the time the exhaust gas recirculation is not effected or the target throttle valve opening degree $\theta 1E$ for the time the exhaust gas recirculation is effected, and delivers a final target throttle opening degree $\theta 2$ to the throttle actuator 7. Thus, the opening degree of the throttle valve 6 is controlled to the final target throttle opering degree $\theta 2$. That is, the multiplier 35 forms the throttle valve driving means 103 shown in FIG. 1.

Processing of the target fuel feed amount signal will be described, hereinbelow.

The output of the target fuel feed amount determining means 37 or the target fuel feed intake air amount signal is input into a larger value selecting circuit 38 into which is also input the output of a minimum fuel feed amount generating means 64. The minimum fuel feed amount generating means 64 may be, for instance, a function generator which selects a minimum fuel feed amount Qfm required to ensure stable idling according to the coolant temperature Tw detected by the water temperature sensor 23 from a seventh map $M_{B7}$ in which the minimum fuel feed amount Qfm is related to the engine coolant temperature Tw. The larger value selecting circuit 38 compares the target fuel feed amount Qf1 and the minimum fuel feed amount Qfm respectively selected from the sixth and seventh maps $M_{B6}$ and $M_{B7}$ with each other, and outputs a signal representing the larger value (Qf2) of the target intake fuel feed amount Qf1 and the minimum fuel feed amount Qfm. The output of the larger value selecting circuit 38 is input into a smaller value selecting circuit 39 into which is also input the output of a maximum fuel feed amount generating means 65. The maximum fuel feed amount generating means 65 may be, for instance, a function generator which selects a maximum fuel feed amount QfM determined depending on the engine rpm Ne (the maximum amount of fuel which may be introduced into the combustion chamber in order to obtain the predetermined air-fuel ratio in conjunction with the maximum intake air amount QaM at a given engine rpm) from an eighth map $M_{B8}$ in which the maximum fuel feed amount QfM is related to the engine rpm. The smaller value selecting circuit 39 compares the larger value Qf2 represented by the output of the larger value selecting circuit 38 with the maximum fuel feed amount QfM corresponding to the engine rpm Ne, and oututs a signal representing the smaller value (Qf3) of the larger value Qf2 and the maximum fuel feed amount QfM. That is, the smaller value Qf3 represents a corrected target fuel feed amount corrected taking into account the engine coolant temperature Tw and the maximum fuel feed amount QfM which is determined to obtain the predetermined air-fuel ratio with respect to the maximum amount of intake air which can be introduced into the combustion chamber with the throttle valve 6 fully opened at a given engine rpm.

The corrected target fuel feed amount Qf3 is input into a divider 40. The divider 40 divides the corrected target fuel feed amount Qf3 by the engine rpm Ne to obtain a target fuel feed amount Qfi for each cylinder assuming that fuel injection is effected in two cylinders at the same time. The target fuel feed amount Qfi for each cylinder is input into a first multiplier 41. The first multiplier 41 multiplies the target fuel feed amount Qfi for each cylinder by a water temperature correction coefficient derived from a ninth map $M_{B9}$ according to the engine coolant temperature Tw and an enrich correction coefficient $C_{ER}$ calculated in an enrich correction module 46, thereby calculating a first corrected target fuel feed amount Qfi1. The enrich correction module 46 outputs, for instance, an enrich correction coefficient $C_{ER}$ of 1.08 to uniformly increase the fuel feed amount by 8% when the target intake air amount Ac1 for each cylinder with respect to the engine rpm Ne is in an enrich zone according to a zone signal from a zone determination module 50 to be described later. The first corrected target fuel feed amount Qfi1 is input into a second multiplier 42. The second multiplier 42 multiplies the first corrected target fuel feed amount Qfi1 by a learning correction coefficient $C_{STD}$ calculated in a learning correction module 47, thereby calculating a second corrected target fuel feed amount Qfi2. The learning correction module 47 initializes the learning correction coefficient $C_{STD}$ as 1.0 (the initial value of the learning correction coefficient $C_{STD}=1.0$), for instance, two seconds after the feedback correction conditions in a fuel feed feedback correction module 48 (to be described later) are satisfied on the basis of the zone signal from the zone determination module 50 and a fuel feed feedback coefficient $Cf_{FB}$ from the fuel feed feedback correction module 48, and thereafter renews the learning correction coefficient $C_{STD}$ in accordance with the following formula.

$$C_{STD} = C_{STD} + \tfrac{1}{8} \cdot [(\text{maximum value of the last eight values of } Cf_{FB} + \text{minimum value of the last eight values of } Cf_{FB})/16 - 1.0]$$

The second corrected target fuel feed amount Qfi2 is input into a fourth multiplier 43 and multiplied by the fuel feedback correction coefficient $Cf_{FB}$ calculated in the fuel feedback correction module 48, whereby a third corrected target fuel feed amount Qfi3 is obtained. The fuel feedback correction module 48 outputs the fuel feedback correction coefficient $Cf_{FB}$ ($0.8 \leq Cf_{FB} \leq 1.25$) to feedback-control the fuel feed amount when the following conditions are satisfied based on the zone signal from the zone determination module 50 and the air-fuel ratio signal from the oxygen sensor 24.

1. The engine coolant temperature Tw is higher than 60° C.
2. The target intake air amount Ac1 for each cylinder is not smaller than 10% of the swept volume of each cylinder.
3. The target intake air amount Ac1 with respect to the engine rpm Ne is neither in the enrich zone nor in the fuel-cut zone.
4. The oxygen sensor 24 is active.

The third corrected target fuel feed amount Qfi3 is input into a fuel injection pulse correction circuit 45 by way of a fuel cut switch 44 which is opened and closed under the control of an output signal of a fuel-cut control module 49. The fuel-cut control module 49 opens the fuel cut switch 44 to cut fuel feed to the engine 1 when the following conditions are satisfied based on the zone signal from the zone determination module 50 and the signal from the divider 32 representing the target intake air amount Ac1 for each cylinder.

1. The engine coolant temperature Tw is higher than 60° C.
2. The target intake air amount Ac1 for each cylinder is smaller than 10% of the swept volume of each cylinder.
3. The engine rpm Ne is higher than 1000 rpm.

The zone determination module 50 generates the zone signals for the modules 46 to 49 based on the signals representing the engine rpm Ne, the target intake air amount Ac1 for each cylinder, the engine coolant temperature Tw and the air-fuel ratio λ.

The fuel injection pulse correction circuit 45 receives the signals from the third multiplier 43 and the battery 28 respectively representing the third corrected target fuel feed amount Qfi3 and the battery voltage $V_B$, and corrects the fuel injection pulse signal to be delivered to the fuel injection valve 12 according to the battery voltage $V_B$ so that fuel can be injected in the third corrected target fuel feed amount Qfi3 without being affected by the battery voltage $V_B$.

As can be understood from the description above, in the engine control system of this embodiment, both the target intake air amount and the target fuel feed amount are simultaneously determined for a given amount of depression α of the accelerator pedal 5 and the throttle opening degree and the fuel feed amount are controlled independently from each other. Accordingly, the intake air amount and the fuel feed amount are simultaneously converged on the respective target values when the amount of depression α of the accelerator pedal 5 changes. Therefore, even in a transient operating condition of the engine, the air-fuel ratio can be precisely controlled to the predetermined value without delay of change in the fuel feed amount, whereby coughing and misfiring of the engine can be prevented, and the acceleration performance and running performance of the engine are improved.

Further, the amount of intake air and the amount of fuel to be fed to the engine are simultaneously controlled to obtain a predetermined air-fuel ratio for a given amount of depression α of the accelerator pedal 5, the air-fuel ratio can be precisely controlled to the predetermined value without feedback control and accordingly control can be simplified.

Further, in the embodiment described above, when the target intake air amount generated by the target intake air amount determining means 29 is larger than the maximum intake air amount determined depending upon the engine rpm Ne, it is determined that the throttle valve 6 is fully opened, and the target intake air amount is corrected to the maximum intake air amount at that engine rpm and at the same time, the target fuel feed amount is corrected to a value which provides the predetermined air-fuel ratio together with the maximum intake air amount at that engine rpm. Accordingly, unnecessary control action on the throttle valve opening degree according to the target intake air amount can be avoided without adversely affecting the air-fuel ratio (overrich).

We claim:
1. An engine control system comprising:
an accelerator manipulation detecting means for detecting the amount of manipulation of an accelerator of the engine and for supplying an output signal corresponding to a position at an accelerator;
a computing means which includes:
(a) a target intake air amount determining means for determining a target intake air amount based upon the output of the accelerator manipulation detecting means and a predetermined accelerator manipulation amount-target intake air amount characteristic, and
(b) a target fuel feed amount determining means for determining a target fuel feed amount based upon the output of the accelerator manipulation detecting means and a predetermined accelerator manipulation amount-target fuel feed amount characteristic;
a throttle valve driving means responsive to the output of the target intake air amount determining means for controlling a position of a throttle valve to cause the throttle valve to reach a target throttle valve opening position corresponding to the determined target intake air amount;

and a fuel feed control means responsive to the output of the target fuel feed amount determining means for controlling the amount of fuel to be fed to the engine to the target fuel feed amount;

said throttle valve driving means and said fuel feed control means being substantially simultaneously responsive to changes in the position of the accelerator.

2. An engine control system as defined in claim 1 in which said target fuel feed amount determining means determines the target fuel feed amount according to the output of the accelerator manipulation detecting means based upon a map in which the target fuel feed amount is related to the amount of manipulation of the accelerator.

3. An engine control system as defined in claim 1 in which said target throttle valve opening position depends upon the target intake air amount and the engine rpm.

4. An engine control system as defined in claim 3 in which said target throttle valve opening position is based upon a map in which the target throttle valve opening position is related to the target intake air amount and the engine rpm.

5. An engine control system as defined in claim 1 in which said target intake air amount determining means determines the target intake air amount based upon the output of the accelerator manipulation detecting means and upon a map in which the target intake air amount is related to the amount of manipulation of the accelerator.

6. An engine control system as defined in claim 1 further comprising means for limiting the maximum value of the target fuel feed amount to a value which depends on the engine rpm.

7. An engine control system as defined in claim 1 further comprising a feedback correction means which corrects the target fuel feed amount determined by the target fuel feed amount determining means so as to cause a feedback-control of the amount of fuel to be fed to the engine during a particular operating range of the engine.

8. An engine control system as defined in claim 7 further comprising an enrich correction means which corrects the target fuel feed amount determined by the target fuel feed amount determining means to enrich the air-fuel ratio of intake mixture to be fed to the engine during a particular operating range of the engine.

9. An engine control system as defined in claim 7 further comprising a correction means for correcting the target fuel feed amount depending upon the temperature of the engine coolant.

10. An engine control system as defined in claim 7 further comprising a learning correction means for correcting the target fuel feed amount by an amount which is determined from a result of a most recent, predetermined, number of corrections of the target fuel feed amount effected by the feedback correction means.

11. An engine control system as defined in claim 7 further comprising a fuel-cut control means for positively cutting off fuel feed to the engine upon occurrence of a particular operating condition of the engine.

12. An engine control system as defined in claim 1 further comprising means for limiting the minimum value of the target fuel feed amount to a value which depends on the temperature of engine coolant.

13. An engine control system as defined in claim 1 further comprising means for limiting the maximum value of the target intake air amount to a value which depends on the engine rpm.

14. An engine control system as defined in claim 1 further comprising means for limiting the minimum value of the target intake air amount to a value which depends on the temperature of engine coolant.

15. An engine control system as defined in claim 1 further comprising a feedback correction means for correcting the target intake air fuel feed amount determined by the target intake air amount determining means so as to cause a feedback-control of the amount of intake air to be fed to the engine during a particular operating range of the engine.

16. An engine control system as defined in claim 15 further comprising a means for correcting the target intake air fuel feed amount depending upon whether engine exhaust gas recirculation is being effected.

17. An engine control system comprising an accelerator manipulation detecting means for detecting the amount of manipulation of an accelerator of the engine, said accelerator manipulation detecting means having an output signal;

a first function generating means for selecting a target intake air amount related to the amount of manipulation of the accelerator according the a first map in which the target intake air amount is related to the amount of manipulation of the accelerator of the engine; said first function generating means selecting a target intake air amount to obtain a predetermined air-fuel ratio according to the output signal of said accelerator manipulation detecting means from said first map, said target intake air amount being irrespective of an actual fuel feed amount; a second map in which the target fuel feed amount is related to the amount of manipulation of the accelerator; a second function generating means for selecting a target fuel feed amount to be fed to the engine to obtain said predetermined air-fuel ratio according to the magnitude of the output signal from said accelerator manipulation detecting means from said second map, said target fuel feed amount being irrespective of an actual intake air amount; a throttle valve driving means for receiving the output of the target intake air amount determining means and for controlling the throttle valve to obtain a target throttle valve opening degree corresponding to the target intake air amount; and a fuel feed control means for receiving the output of the target fuel feed amount determining means and for controlling the amount of fuel to be fed to the engine to correspond to the target fuel feed amount.

18. An engine control system as defined in claim 17 further comprising an intake air amount feed back correction means which receives an engine rpm signal and an airflow signal and calculates a feeback control coefficient for feedback-controlling said throttle valve opening degree according to the difference between said target intake air amount and said actual intake air amount, and a fuel feed amount feedback correction means which receives a feedback zone signal and an air-fuel ratio signal and calculates a feedback control coefficient for feedback-controlling said fuel feed control means according to the difference between said predetermined air-fuel ratio and said actual air-fuel ratio.

* * * * *